(12) United States Patent
Takekawa

(10) Patent No.: US 11,168,279 B2
(45) Date of Patent: Nov. 9, 2021

(54) LUBRICATING OIL COMPOSITION

(71) Applicant: Idemitsu Kosan Co.,Ltd., Chiyoda-ku (JP)

(72) Inventor: Daisuke Takekawa, Chiba (JP)

(73) Assignee: Idemitsu Kosan Co., Ltd., Chiyoda-ku (JP)

( * ) Notice: Subject to any disclaimer, the term of this patent is extended or adjusted under 35 U.S.C. 154(b) by 0 days.

(21) Appl. No.: 16/630,604

(22) PCT Filed: Feb. 22, 2019

(86) PCT No.: PCT/JP2019/006672
§ 371 (c)(1),
(2) Date: Jan. 13, 2020

(87) PCT Pub. No.: WO2019/167812
PCT Pub. Date: Sep. 6, 2019

(65) Prior Publication Data
US 2020/0181523 A1  Jun. 11, 2020

(30) Foreign Application Priority Data
Feb. 28, 2018  (JP) .............................. JP2018-034937

(51) Int. Cl.
*C10M 141/10* (2006.01)
*C10M 133/06* (2006.01)
(Continued)

(52) U.S. Cl.
CPC ........ *C10M 141/10* (2013.01); *C10M 133/06* (2013.01); *C10M 133/16* (2013.01);
(Continued)

(58) Field of Classification Search
None
See application file for complete search history.

(56) References Cited

U.S. PATENT DOCUMENTS 4,482,464 A  11/1984 Karol et al.
4,512,903 A  4/1985 Schlicht et al.
(Continued)

FOREIGN PATENT DOCUMENTS

JP  59-155356 A  9/1984
JP  2001-288488 A  10/2001
(Continued)

OTHER PUBLICATIONS

International Search Report dated May 14, 2019 in PCT/JP2019/006672 filed on Feb. 22, 2019, citing documents AB, AC, AE-AH, AN and AP-AR therein, 2 pages.
(Continued)

*Primary Examiner* — Vishal V Vasisth
(74) *Attorney, Agent, or Firm* — Oblon, McClelland, Maier & Neustadt, L.L.P.

(57) ABSTRACT

The present invention relates to a lubricating oil composition and a continuously-variable transmission filled with the lubricating oil composition. The present invention also relates to a friction control method for a continuously-variable transmission, the method using the lubricating oil composition. This lubricating oil composition is characterized by containing: (A) a base oil; (B) a diamine; (C) a glycolic acid amide; and (D) a phosphorous ester. With this lubricating oil composition, it is possible to provide different wear characteristics between different parts, so in a preferable embodiment of the present invention, the lubricating oil composition is suitably used as a lubricating oil for variable transmissions, in particular, metal-belt continuously-variable transmissions.

10 Claims, 2 Drawing Sheets

(51) Int. Cl.
*C10M 133/16* (2006.01)
*C10M 137/02* (2006.01)
*C10M 169/04* (2006.01)
*C10N 30/02* (2006.01)
*C10N 40/04* (2006.01)

(52) U.S. Cl.
CPC ........ *C10M 137/02* (2013.01); *C10M 169/04* (2013.01); *C10M 2215/04* (2013.01); *C10M 2215/082* (2013.01); *C10M 2223/049* (2013.01); *C10M 2290/02* (2013.01); *C10N 2030/02* (2013.01); *C10N 2040/04* (2013.01)

(56) References Cited

U.S. PATENT DOCUMENTS

| | | | |
|---|---|---|---|
| 4,647,389 | A | 3/1987 | Karol et al. |
| 9,506,010 | B2 | 11/2016 | Narita |
| 9,567,547 | B2 | 2/2017 | Sumiejski et al. |
| 2009/0312207 | A1* | 12/2009 | Bartley ................ C10M 141/10 508/161 |
| 2010/0144565 | A1* | 6/2010 | Ikeda .................. C10M 163/00 508/151 |
| 2011/0053816 | A1 | 3/2011 | Narita |
| 2012/0149619 | A1 | 6/2012 | Narita |
| 2014/0378357 | A1 | 12/2014 | Narita et al. |
| 2015/0024986 | A1 | 1/2015 | Loper |
| 2019/0316058 | A1 | 10/2019 | Yanagihara et al. |

FOREIGN PATENT DOCUMENTS

| | | |
|---|---|---|
| JP | 2009-167337 A | 7/2009 |
| JP | 2013-189565 A | 9/2013 |
| JP | 2015-21126 A | 2/2015 |
| JP | 2018-65923 A | 4/2018 |
| WO | WO 2011/037054 A1 | 3/2011 |

OTHER PUBLICATIONS

Supplementary European Search Report dated Mar. 11, 2021, in European Patent Application No. 19759979.8 filed Feb. 22, 2019, citing document AA, 7 pages.

* cited by examiner

LUBRICATING OIL COMPOSITION

This application is a 371 of PCT/JP2019/006672, filed Feb. 22, 2019.

TECHNICAL FIELD

The present invention relates to a lubricating oil composition, a friction control method for continuously variable transmissions, and a continuously variable transmission filled with the lubricating oil composition.

BACKGROUND ART

Recently, as transmissions to be used for automobiles, etc., metal belt-type, chain-type, toroidal-type or another type continuously variable transmissions (CVT) have been developed and have already been put to practical use. Initially, lubricating oils for automatic transmissions had been used as lubricating oils for such continuously variable transmissions. However, with the improvement of performance of continuously variable transmissions, lubricating oils have been required to provide more excellent performance. In particular, since friction characteristics of lubricating oils to be used for wet clutches of automatic transmissions are optimized as those for automatic transmissions, when such lubricating oils are used for continuously variable transmissions, a friction coefficient between metals tends to be insufficient, and there is a problem that it is difficult to perform high-capacity torque transmission.

In response to this, various lubricating oils for continuously variable transmissions have been developed. For example, a lubricating oil composition containing (a) an alkaline earth metal sulfonate or phenate, (b) an imide compound and (c) a phosphorus-based compound (see Patent Literature 1), and a lubricating oil composition obtained by blending (A) at least one phosphorus-containing compound selected from among a phosphoric acid monoester, a phosphoric acid diester and a phosphorous acid monoester, the compound having a hydrocarbon group having 1 to 8 carbon atoms and (B) a tertiary amine compound with a substituent that is a hydrocarbon group having 6 to 10 carbon atoms (see Patent Literature 2) have been proposed.

In addition, a lubricating oil composition obtained by blending (A) a tertiary amine, (B) an acidic phosphoric acid ester or the like and (C) a metal sulfonate or the like (see Patent Literature 3), and a lubricating oil composition obtained by blending (A) a primary amine, (B) a tertiary amine, (C) a metal sulfonate or the like and (D) an acidic phosphoric acid ester or the like (see Patent Literature 4) have also been proposed.

The lubricating oil compositions described in these patent literatures have a high friction coefficient between metals as a lubricating oil for continuously variable transmissions.

CITATION LIST

Patent Literature

Patent Literature 1: Japanese Laid-Open Patent Publication No. 2001-288488
Patent Literature 2: Japanese Laid-Open Patent Publication No. 2009-167337
Patent Literature 3: International Publication WO2011/037054 pamphlet
Patent Literature 4: Japanese Laid-Open Patent Publication No. 2013-189565

SUMMARY OF INVENTION

Technical Problem

Regarding lubricating oils for metal belt-type continuously variable transmissions, a high friction coefficient between metals between an element and a pulley is required for power transmission, while between a gear and a bearing that are constituents of continuously variable transmissions, a low friction coefficient between metals is desired from the viewpoint of the improvement of efficiency. Conventionally, lubricating oils achieving a balance between required characteristics between such different parts had not been examined.

Under such circumstances, it is considered that the present invention provides a lubricating oil composition, which achieves a balance between different friction characteristics between different parts, and which is suitably used as a lubricating oil for transmissions, particularly as a lubricating oil for metal belt-type continuously variable transmissions.

Solution to Problem

The present invention relates to a lubricating oil composition, a friction reduction method for continuously variable transmissions and a continuously variable transmission filled with the lubricating oil composition described below.
[1] A lubricating oil composition comprising a base oil (A), a diamine (B), a glycolic acid amide (C) and a phosphorous acid ester (D).
[2] A continuously variable transmission filled with the lubricating oil composition according to item [1].
[3] A friction control method for continuously variable transmissions, which includes using the lubricating oil composition according to item [1].

Advantageous Effects of Invention

According to the present invention, it is possible to achieve a balance between different friction characteristics between different parts. According to a preferred embodiment of the present invention, it is possible to provide a lubricating oil composition, wherein a friction coefficient between metals between an element and a pulley is high and a friction coefficient between metals between a gear and a bearing that are constituents of continuously variable transmissions is low. The lubricating oil composition of the present invention can be suitably used as a lubricating oil for continuously variable transmissions, particularly as a lubricating oil for continuously variable transmissions of a metal belt-type or the like.

DESCRIPTION OF EMBODIMENT

Figure 1:
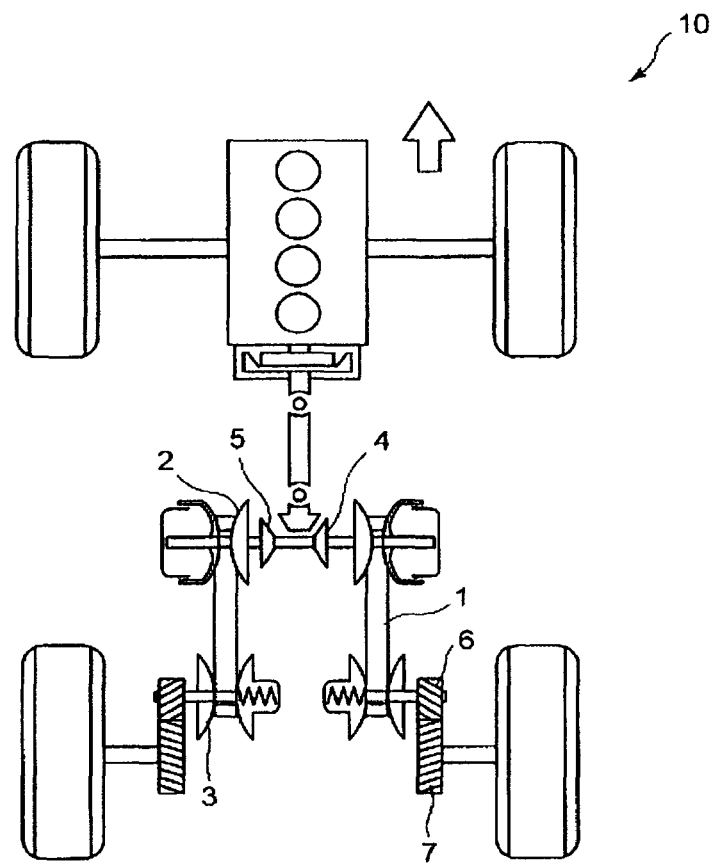
FIG. 1 is a schematic view of a metal belt-type continuously variable transmission according to one embodiment of the present invention.

Hereinafter, embodiments of the present invention will be described in detail.

1. Lubricating Oil Composition

The lubricating oil composition of the present invention is characterized in that it comprises at least a base oil (A), a diamine (B), a glycolic acid amide (C) and a phosphorous acid ester (D). Hereinafter, the respective components will be described in detail.

(A) Base Oil

The base oil as the component (A) to be used in the present invention is not particularly limited, and any material may be suitably selected from among mineral oils and synthetic oils and used. For example, at least one selected from the group consisting of mineral oils and synthetic oils is preferably used. Only one of a mineral oil and a synthetic oil may be used, or a mineral oil and a synthetic oil may be used in combination. As mineral oils and synthetic oils, those generally used as base oils for transmissions are preferred.

The kinetic viscosity of the base oil is not particularly limited, but according to one embodiment of the present invention, the kinetic viscosity at 40° C. is preferably 5 mm$^2$/s to 35 mm$^2$/s, more preferably 7 mm$^2$/s to 30 mm$^2$/s, and even more preferably 9 mm$^2$/s to 25 mm$^2$/s. When the kinetic viscosity at 40° C. is within the above-described range, flowability at low temperatures can be ensured, and seizure at high temperatures can be prevented.

Further, the kinetic viscosity of the base oil at 100° C. is preferably 1 mm$^2$/s to 50 mm$^2$/s, more preferably 2 mm$^2$/s to 30 mm$^2$/s, and even more preferably 3 mm$^2$/s to 20 mm$^2$/s. When the kinetic viscosity at 100° C. is within the above-described range, flowability at low temperatures can be ensured, and seizure at high temperatures can be prevented.

The pour point of the base oil as an index of low temperature flowability thereof is not particularly limited, but according to one embodiment of the present invention, the pour point is preferably −10° C. or lower, more preferably −15° C. or lower, and even more preferably −20° C. or lower. When the pour point is within the above-described range, flowability at low temperatures can be ensured.

According to one embodiment of the present invention, the base oil preferably has a saturated hydrocarbon content of 90% by mass or more, a sulfur content of 0.03% by mass or less and a viscosity index of 100 or more. The viscosity index is more preferably 105 or more, and even more preferably 110 or more.

When the saturated hydrocarbon content is 90% by mass or more, the production of a deteriorated product can be reduced. Similarly, when the sulfur content is 0.03% by mass or less, the production of a deteriorated product can be reduced. Moreover, when the viscosity index is 100 or more, abrasion at high temperatures can be suppressed. The larger the viscosity index of the base oil is, the better it is, and the upper limit thereof is not particularly limited, but it is generally 150 or less.

Preferred examples of mineral oils include a naphthene-based mineral oil, a paraffin-based mineral oil and Gas To Liquid (GTL). Specific examples thereof include a light neutral oil, a medium neutral oil, a heavy neutral oil and a bright stock which are produced by solvent purification or hydrogenation purification.

Preferred examples of synthetic oils include polybutene or a hydride thereof, poly-α-olefin (1-octene oligomer, 1-decene oligomer, etc.), α-olefin copolymer, alkylbenzene, polyol ester, dibasic acid ester, polyoxyalkylene glycol, polyoxyalkylene glycol ester, polyoxyalkylene glycol ether, hindered ester and silicone oil.

The respective mineral oils and synthetic oils may be used solely, or two or more of them may be used in combination.

In this specification, the kinetic viscosity at predetermined temperatures and the viscosity index mean values obtained by the measurement in accordance with JIS K2283:2000. Further, the pour point of the base oil means the lowest temperature at which a mineral oil-based lubricating oil flows when cooled according to the method defined by JIS K2269. Further, the sulfur content means a value obtained by the measurement in accordance with JIS K2541-3.

When using two or more base oils, the aforementioned numerical values mean numerical values of a base oil obtained by mixing thereof.

The content of the base oil (A) is preferably 60% by mass to 99.98% by mass, more preferably 70% by mass to 99% by mass, even more preferably 75% by mass to 98% by mass, and still more preferably 80% by mass to 98% by mass based on the total amount of the composition. When the content is within the above-described range, solubility of additives can be ensured.

(B) Diamine

The diamine (B) to be used in the present invention is not particularly limited as long as it has two substituted or unsubstituted amino groups, but it is preferably a compound represented by general formula (I):

wherein: $R^1$ and $R^2$ each independently represent hydrogen or a hydrocarbon group; and $R^3$ represents a divalent hydrocarbon group. By using the compound represented by general formula (I) as the diamine (B), a low friction coefficient between metals between a gear and a bearing can be obtained.

$R^1$ is hydrogen or a hydrocarbon group.

When $R^1$ is a hydrocarbon group, the carbon number of the hydrocarbon group is preferably 16 to 22, more preferably 16 to 20, and even more preferably 17 to 19. When the carbon number is within the above-described range, the friction coefficient between metals between the element and the pulley can be effectively increased.

Examples of the hydrocarbon group include an alkyl group, an alkenyl group, an aryl group and an aralkyl group. Among these hydrocarbon groups, an aliphatic hydrocarbon group is preferred, and in particular, an alkenyl group is more preferred. Examples thereof include a hexadecyl group, a heptadecyl group, an octadecyl group, a nonadecyl group, an eicosyl group, a heneicosyl group, a docosyl group and an oleyl group. Among them, an oleyl group is most preferred.

Further, the carbon chain portion may have either a linear structure or a branched structure, but the linear structure is particularly preferred from the viewpoint of increasing the friction coefficient between metals between the element and the pulley.

$R^2$ is hydrogen or a hydrocarbon group. When $R^2$ is a hydrocarbon group, it is preferably an alkyl group. Further, the carbon number of $R^2$ is preferably 3 or less. Examples of the alkyl group include a methyl group, an ethyl group and a propyl group. From the viewpoint of decreasing the friction coefficient between metals between the gear and the bearing, $R^2$ is preferably a propyl group.

$R^3$ is a divalent hydrocarbon group, and preferably an alkylene group. The carbon number of $R^3$ is preferably about 1 to 5 from the viewpoint of stability, and it is more preferably 2 to 5, even more preferably 2 to 4, and particularly preferably 3.

The content of the diamine (B) is preferably 0.03% by mass to 0.1% by mass, more preferably 0.04% by mass to 0.09% by mass, and even more preferably 0.05% by mass to 0.08% by mass based on the total amount of the composition. When the content is within the above-described range, a low friction coefficient between metals between the gear and the bearing can be obtained.

(C) Glycolic Acid Amide

The glycolic acid amide (C) to be used in the present invention is not particularly limited, but it is preferably a compound represented by general formula (II):

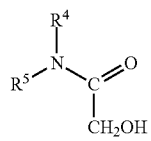

(II)

wherein $R^4$ and $R^5$ each independently represent hydrogen or a hydrocarbon group.

$R^4$ and $R^5$ each independently represent hydrogen or a hydrocarbon group. When each of $R^4$ and $R^5$ is a hydrocarbon group, the carbon number of the hydrocarbon group is preferably 6 to 24, more preferably 8 to 20, and even more preferably 10 to 18. When the carbon number is within the above-described range, a high friction coefficient between metals between an element and a pulley can be maintained, and in addition, anti-shudder performance is obtained.

Examples of the hydrocarbon group include an alkyl group, an alkenyl group, an alkadiene group, a cycloalkyl group, an aryl group and an arylalkyl group.

Examples of the alkyl group include various hexyl groups such as an n-hexyl group, an isohexyl group, an s-hexyl group and a t-hexyl group (hereinafter, functional groups having a predetermined carbon number including linear and branched ones and isomers thereof may be abbreviated as various functional groups), various heptyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups, various nonadecyl groups, various eicosyl groups, various heneicosyl groups, various docosyl groups, various tricosyl groups and various tetracosyl groups.

Examples of the alkenyl group include various hexenyl groups, various heptenyl groups, various octenyl groups, various nonenyl groups, various decenyl groups, various undecenyl groups, various dodecenyl groups, various tridecenyl groups, various tetradecenyl groups, various pentadecenyl groups, various hexadecenyl groups, various heptadecenyl groups, various octadecenyl groups, various nonadecenyl groups, various eicosenyl groups, various heneicosenyl groups, various docosenyl groups, various tricosenyl groups and various tetracosenyl groups.

Examples of the alkadiene group include various hexadiene groups, various heptadiene groups, various octadiene groups, various nonadiene groups, various decadiene groups, various undecadiene groups, various dodecadiene groups, various tridecadiene groups, various tetradecadiene groups, various pentadecadiene groups, various hexadecadiene groups, various heptadecadiene groups, various octadecadiene groups, various nonadecadiene groups, various eicosadiene groups, various heneicosadiene groups, various docosadiene groups, various tricosadiene groups and various tetracosadiene groups.

Examples of the cycloalkyl group include a cyclohexyl group, various methylcyclohexyl groups, various ethylcyclohexyl groups and various dimethylcyclohexyl groups.

Examples of the aryl group include a phenyl group, various methylphenyl groups, various ethylphenyl groups, various dimethylphenyl groups, various propylphenyl groups, various trimethylphenyl groups, various butylphenyl groups and various naphthyl groups.

Examples of the arylalkyl group include a benzyl group, a phenethyl group, various phenylpropyl groups, various phenylbutyl groups, various methylbenzyl groups, various ethylbenzyl groups, various propylbenzyl groups, various butylbenzyl groups and various hexylbenzyl groups.

Regarding $R^4$ and $R^5$ in general formula (II) above as the glycolic acid amide (C), it is preferred that in the whole $R^4$ and $R^5$, the content of a hydrocarbon group having 12 carbon atoms is 30% by mass to 75% by mass and the content of a hydrocarbon group having 14 carbon atoms is 5% by mass to 40% by mass. By employing such an amide compound, a high friction coefficient between metals and excellent anti-shudder performance are obtained. In this regard, "the whole $R^4$ and $R^5$" means the whole amount (total amount) of $R^4$ and $R^5$ in the glycolic acid amide represented by general formula (II). Accordingly, "the content of a hydrocarbon group having 12 carbon atoms in the whole $R^4$ and $R^5$" means the content of the hydrocarbon group having 12 carbon atoms contained as at least one of $R^4$ and $R^5$ in the glycolic acid amide represented by general formula (II) based on the whole amount (total amount) of $R^4$ and $R^5$. For example, when using a plurality of glycolic acid amides represented by general formula (II), the whole amount (total amount) of $R^4$ and $R^5$ contained in the respective amide compounds is referred to as "the whole $R^4$ and $R^5$", and the content of the hydrocarbon group having 12 carbon atoms contained as at least one of $R^4$ and $R^5$ is referred to as "the content of the hydrocarbon group having 12 carbon atoms in the whole $R^4$ and $R^5$". The same applies to "the content of the hydrocarbon group having 14 carbon atoms in the whole $R^4$ and $R^5$". Note that as the glycolic acid amide of the present invention, a reaction product of amine and glycolic acid may also be used.

From the viewpoint of obtaining a high friction coefficient between metals and excellent anti-shudder performance, the content of the hydrocarbon group having 12 carbon atoms in the whole $R^4$ and $R^5$ is preferably 33% by mass or more, more preferably 35% by mass or more, and even more preferably 40% by mass or more. The upper limit of the content is preferably 70% by mass or less, more preferably 68% by mass or less, and even more preferably 65% by mass or less. Further, the content of the hydrocarbon group having 12 carbon atoms in the whole $R^4$ and $R^5$ is preferably 33% by mass to 70% by mass, more preferably 35% by mass to 68% by mass, and even more preferably 40% by mass to 65% by mass. The content of the hydrocarbon group having 14 carbon atoms in the whole $R^4$ and $R^5$ is preferably 7% by mass or more, more preferably 10% by mass or more, and even more preferably 13% by mass or more. The upper limit of the content is preferably 35% by mass or less, more preferably 30% by mass or less, and even more preferably 25% by mass or less. Further, the content of the hydrocarbon group having 14 carbon atoms in the whole $R^4$ and $R^5$ is preferably 7% by mass to 35% by mass, more preferably 10% by mass to 30% by mass, and even more preferably 13% by mass to 25% by mass.

The content of the glycolic acid amide (C) is preferably 0.1% by mass to 3% by mass, more preferably 0.2% by mass to 2% by mass, and even more preferably 0.3% by mass to 1% by mass based on the total amount of the composition. When the content is within the above-described range, a high friction coefficient between metals between the element and the pulley can be maintained, and in addition, anti-shudder performance is obtained.

(D) Phosphorous Acid Ester

Specific examples of the phosphorous acid ester (D) include a compound represented by formula (III):

$$(R^6O)_aP(OH)_{3-a} \quad (III)$$

In the formula, $R^6$ represents a hydrocarbon group having 2 to 24 carbon atoms, and a is an integer of 1 to 3. When a is 2 or 3, $R^6$s may be the same or different from each other.

Examples of the hydrocarbon group having 2 to 24 carbon atoms represented by $R^6$ in formula (III) include an alkyl group having 2 to 24 carbon atoms, an alkenyl group having 2 to 24 carbon atoms, an aryl group having 6 to 24 carbon atoms and an aralkyl group having 7 to 24 carbon atoms.

The alkyl group and the alkenyl group may be either linear, branched or cyclic, and examples thereof include an ethyl group, an n-propyl group, an isopropyl group, an n-butyl group, an isobutyl group, a sec-butyl group, a tert-butyl group, various pentyl groups, various hexyl groups, various octyl groups, various decyl groups, various dodecyl groups, various tetradecyl groups, various hexadecyl groups, various octadecyl groups, various nonadecyl groups, various eicosyl groups, various heneicosyl groups, various docosyl groups, various tricosyl groups, various tetracosyl groups, a cyclopentyl group, a cyclohexyl group, an allyl group, a propenyl group, various butenyl groups, various hexenyl groups, various octenyl groups, various decenyl groups, various dodecenyl groups, various tetradecenyl groups, various hexadecenyl groups, various octadecenyl groups, various nonadecenyl groups, various eicosenyl groups, various heneicosenyl groups, various docosenyl groups, various tricosenyl groups, various tetracosenyl groups, a cyclopentenyl group and a cyclohexenyl group. In this regard, "various" indicates that linear ones, and all branched ones that are structural isomers thereof are included, and the same applies to the following.

Examples of the aryl group having 6 to 24 carbon atoms include a phenyl group, a tolyl group, a xylyl group and a naphthyl group. Examples of the aralkyl group having 7 to 24 carbon atoms include a benzyl group, a phenethyl group, a naphthylmethyl group, a methylbenzyl group, a methylphenethyl group and a methylnaphthylmethyl group.

As the phosphorous acid ester (D), in formula (III), it is preferred that a is 1 or 2 and $R^6$ is an aliphatic hydrocarbon group having 2 to 10 carbon atoms, it is more preferred that a is 1 or 2 and $R^6$ is an aliphatic hydrocarbon group having 2 to 8 carbon atoms, and the aliphatic hydrocarbon group is more preferably an alkyl group.

Examples of the above-described phosphorous acid ester (D) include ethyl hydrogen phosphite, n-propyl hydrogen phosphite, n-butyl hydrogen phosphite and 2-ethylhexyl hydrogen phosphite, and among them, 2-ethylhexyl hydrogen phosphite is preferred.

As the phosphorous acid ester (D), these materials may be used solely, or two or more of them may be used in combination.

The content of the phosphorous acid ester (D) is preferably 0.05% by mass to 2% by mass, more preferably 0.1% by mass to 1.8% by mass, and even more preferably 0.8% by mass to 1.4% by mass based on the total amount of the composition. When the content is within the above-described range, a high friction coefficient between metals between the element and the pulley can be obtained.

(E) Polymethacrylate

In the present invention, a polymethacrylate (PMA) may be contained.

As the polymethacrylate to be used in the present invention, polyalkyl methacrylate and the like are preferred. The polymethacrylate is contained for the purpose of appropriately improving the viscosity index. The polymethacrylate may be either dispersant or non-dispersant, but it is preferably non-dispersant. Further, it may be either linear or branched. Moreover, it may be a polymer having a specific structure such as a comb-shaped polymer having a structure in which the main chain has many three-way branch points from which a high-molecular-weight side chain extends.

In the present invention, as the polymethacrylate, a polymethacrylate having a structural unit represented by general formula (IV) below and having a monovalent functional group containing an oxygen atom in the molecule (in this specification, also referred to as "multipoint adsorption-type polymethacrylate") may be contained.

(IV)

In general formula (IV), $R^a$ represents a divalent aliphatic hydrocarbon group having 24 to 40 carbon atoms, and $X^1$ represents a monovalent functional group containing an oxygen atom. The carbon number of $R^a$ is preferably 24 or more from the viewpoint of the viscosity index. Further, the carbon number is preferably 40 or less from the viewpoint of shear stability.

Examples of the divalent aliphatic hydrocarbon group having 24 to 40 carbon atoms as $R^a$ include an alkylene group and an alkenylene group, and from the viewpoint of easily achieving a balance between a high viscosity index and high shear stability, an alkylene group is preferred. It may be either linear, branched or cyclic, but from the viewpoint of easily achieving a balance between a high viscosity index and high shear stability, it is preferably linear or branched. Further, from the same viewpoint, the carbon number is preferably 28 to 40, and more preferably 30 to 40.

Examples of the alkylene group having 24 to 40 carbon atoms include various tetracosylene groups such as an n-tetracosylene group, an isotetracosylene group and isomers thereof (hereinafter, functional groups having a predetermined carbon number including linear and branched ones and isomers thereof may be abbreviated as various functional groups), various pentacosylene groups, various hexacosylene groups, various heptacosylene groups, various octacosylene groups, various nonacosylene groups, various triacontylene groups, various hentriacontylene groups, various dotriacontylene groups, various tritriacontylene groups, various tetratriacontylene groups, various pentatriacontylene groups, various hexatriacontylene groups, various heptatriacontylene groups, various octatriacontylene groups, various nonatriacontylene groups and various tetracontylene groups.

In general formula (IV), $X^1$ is a monovalent functional group containing an oxygen atom. When it is a monovalent functional group containing an oxygen atom, a high viscosity index and high shear stability can be obtained. From the viewpoint of easily achieving a balance between a high viscosity index and high shear stability, for example, a hydroxy group, an alkoxy group, an aldehyde group, a carboxy group, an ester group, a nitro group, an amide group, a carbamate group and a sulfo group are preferred. Among them, a hydroxy group and an alkoxy group are more preferred, and a hydroxy group is even more preferred. In this regard, as the alkoxy group, those including an alkyl group having 1 to 30 carbon atoms are preferred, and the alkyl group may be either linear or branched.

Further, the multipoint adsorption-type polymethacrylate may have another structural unit represented by general formula (V) below as long as it has the above-described structural unit represented by general formula (IV).

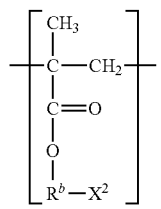
(V)

In general formula (V), $R^b$ represents a divalent aliphatic hydrocarbon group having 1 to 40 carbon atoms, and $X^2$ represents a monovalent functional group.

Examples of the divalent aliphatic hydrocarbon group having 1 to 40 carbon atoms as $R^b$ include a divalent aliphatic hydrocarbon group having 1 to 23 carbon atoms in addition to the divalent aliphatic hydrocarbon group having 24 to 40 carbon atoms mentioned as the example of $R^a$. From the viewpoint of easily achieving a balance between a high viscosity index and high shear stability, as the divalent aliphatic hydrocarbon group having 1 to 23 carbon atoms, for example, an alkylene group and an alkenylene group are preferred, and an alkylene group is more preferred. The alkylene group may be either linear or branched, and the carbon number is more preferably 1 to 30.

Examples of the monovalent functional group as $X^2$ include aryl groups such as a phenyl group, a benzyl group, a tolyl group and a xylyl group, heterocyclic groups such as a furanyl group, a thiophenyl group, a pyridinyl group and a carbazolyl group, and organic groups containing a heteroatom represented by general formulae (VI) and (VII) below. When the carbon number of $R^b$ is 1 to 23, examples also include, in addition to these monovalent functional groups, the functional group containing an oxygen atom mentioned as the example of $X^1$, etc.

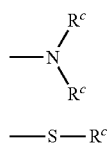
(VI)

(VII)

In general formulae (VI) and (VII), $R^c$s each independently represent a hydrogen atom or a monovalent aliphatic hydrocarbon group having 1 to 30 carbon atoms. From the viewpoint of easily achieving a balance between a high viscosity index and high shear stability, as the monovalent aliphatic hydrocarbon group, for example, an alkyl group and an alkenyl group are preferred, and an alkyl group is more preferred. Further, the monovalent aliphatic hydrocarbon group may be either linear or branched.

It is sufficient when the multipoint adsorption-type polymethacrylate has the structural unit represented by general formula (IV), and the ratio of the structural unit is not particularly limited. However, from the viewpoint of easily achieving a balance between a high viscosity index and high shear stability, the copolymerization ratio between the structural unit represented by general formula (IV) and a structural unit other than the structural unit represented by general formula (IV) such as the above-described another structural unit (e.g., the structural unit represented by general formula (V)) is preferably 10:90 to 90:10, more preferably 20:80 to 80:20, and even more preferably 30:70 to 70:30.

The mass average molecular weight of the polymethacrylate to be used in the present invention is preferably 5,000 or more, more preferably 15,000 or more, even more preferably 20,000 or more, and particularly preferably 25,000 or more. Further, the upper limit thereof is preferably 100,000 or less, more preferably 80,000 or less, even more preferably 70,000 or less, and particularly preferably 55,000 or less. Further, the mass average molecular weight of the polymethacrylate is preferably 5,000 to 100,000, more preferably 15,000 to 80,000, even more preferably 20,000 to 70,000, and particularly preferably 25,000 to 55,000. When the mass average molecular weight of the polymethacrylate is within the above-described range, a balance between a high viscosity index and high shear stability can be easily achieved.

In this regard, the mass average molecular weight can be obtained by the measurement according to the gel permeation chromatography (GPC) method and the production of a calibration curve using polystyrene. For example, the mass average molecular weight of each of the above-described polymers can be calculated as a polystyrene equivalent value according to the GPC method as described below.

<GPC Measurement Apparatus>
    Column: TOSO GMHHR-H(S)HT
    Detector: RI detector for liquid chromatogram WATERS 150C
<Measurement Conditions, Etc.>
    Solvent: 1,2,4-trichlorobenzene
    Measurement temperature: 145° C.
    Flow rate: 1.0 ml/min
    Sample concentration: 2.2 mg/ml
    Injection amount: 160 µl
    Calibration curve: Universal Calibration
    Analysis program: HT-GPC (Ver. 1.0)

The content of the polymethacrylate is usually 1% by mass or more, preferably 3% by mass or more, and more preferably 4% by mass or more based on the total amount of the composition, while the upper limit thereof is usually 15% by mass or less, preferably 13% by mass or less, and more preferably 11% by mass or less. When the content of the polymethacrylate is within the above-described range, the effect of the addition of the polymethacrylate is sufficiently obtained, and a balance between a high viscosity index and high shear stability can be easily achieved.

(F) Ashless Friction Modifier

The lubricating oil composition of the present invention may contain an ashless friction modifier according to need. When the ashless friction modifier is contained, a lower friction coefficient between metals between the gear and the bearing may be obtained.

Examples of the ashless friction modifier include an ester-based ashless friction modifier and an amine-based ashless friction modifier. As the ashless friction modifier, such materials may be used solely, or two or more of them may be used in combination.

Examples of the ester-based ashless friction modifier include an ester of a fatty acid and an aliphatic alcohol. Examples of the fatty acid include an aliphatic monocarboxylic acid having a linear or branched hydrocarbon group having 6 to 30 carbon atoms, and the carbon number of the hydrocarbon group is preferably 8 to 24, and more preferably 10 to 20. In this regard, the hydrocarbon group refers to a hydrocarbon moiety of the fatty acid from which the carboxyl group is excluded.

Further, as the aliphatic alcohol, an aliphatic polyhydric alcohol is used. The ester of the fatty acid and the aliphatic alcohol may be either a partial ester, wherein only a part of alcohol is esterified, or a complete ester, wherein the whole alcohol is esterified, but usually a partial ester is used.

Examples of the linear or branched hydrocarbon group having 6 to 30 carbon atoms include: an alkyl group such as a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a pentaicosyl group, a docosyl group, a tricosyl group, a tetracosyl group, a pentacosyl group, a hexacosyl group, a heptacosyl group, an octacosyl group, a nonacosyl group and a triacontyl group; an alkenyl group such as a hexenyl group, a heptenyl group, an octenyl group, a nonenyl group, a decenyl group, an undecenyl group, a dodecenyl group, a tridecenyl groups, a tetradecenyl group, a pentadecenyl group, a hexadecenyl group, a heptadecenyl group, an octadecenyl group, a nonadecenyl group, an eicosenyl group, a heneicosenyl group, a docosenyl group, a tricosenyl group, a tetracosenyl group, a pentacosenyl group, a hexacosenyl group, a heptacosenyl group, an octacosenyl group, a nonacosenyl group and a triacontenyl group; and a hydrocarbon group having two or more double bonds. The above-described alkyl group, alkenyl group and hydrocarbon group having two or more double bonds include all of possible linear structures and branched structures, and the double bond(s) in the alkenyl group and hydrocarbon group having two or more double bonds may be at any position.

Specific examples of the fatty acid include: a saturated fatty acid such as caproic acid, caprylic acid, capric acid, lauric acid, myristic acid, palmitic acid, stearic acid, arachidic acid, behenic acid and lignoceric acid; and an unsaturated fatty acid such as myristoleic acid, palmitoleic acid, oleic acid and linolenic acid. The unsaturated fatty acid is preferred, and oleic acid is more preferred.

The above-described aliphatic polyhydric alcohol includes dihydric to hexahydric alcohols. Examples thereof include ethylene glycol, glycerin, trimethylolpropane, pentaerythritol and sorbitol, and glycerin is preferred.

Specifically, as the ester-based ashless friction modifier, an ester of glycerin and the above-described aliphatic monocarboxylic acid is preferred. The ester may be a complete ester, but is preferably a partial ester. In particular, a partial ester obtained by a reaction between glycerin and the above-described unsaturated fatty acid is more preferred. Specific examples thereof include a monoester such as glycerin monomyristate, glycerin monopalmitate and glycerin monooleate, and a diester such as glycerin dimyristate, glycerin dipalmitate and glycerin dioleate.

Examples of the amine-based ashless friction modifier include an aliphatic amine compound, and examples of the aliphatic amine compound include an amine compound having a linear or branched hydrocarbon group having 6 to 30 carbon atoms. The hydrocarbon group of the amine compound preferably has 8 to 24 carbon atoms, and more preferably has 10 to 20 carbon atoms. In the hydrocarbon group having 6 to 30 carbon atoms, those mentioned as examples of the hydrocarbon group of the fatty acid above are included.

Examples of the aliphatic amine compound include an aliphatic monoamine or alkylene oxide adducts thereof, an alkanolamine, an aliphatic polyamine and an imidazoline compound. Specific examples thereof include: aliphatic amine compounds such as laurylamine, lauryldiethylamine, lauryldiethanolamine, dodecyldipropanolamine, palmitylamine, stearylamine, stearyltetraethylenepentamine, oleylamine, oleylpropylenediamine, oleyldiethanolamine, dimethyloctadecylamine and N-hydroxyethyloleylimidazoline; and adducts of an amine alkylene oxide such as adducts of N,N-dipolyoxyalkylene-N-alkyl (or alkenyl) (carbon number: 6 to 28) to the aliphatic amine compounds.

As the ashless friction modifier, amine-based ashless friction modifiers are preferred. Among them, as described above, stearylamine, stearyltetraethylenepentamine, oleylamine, oleylpropylenediamine, oleyldiethanolamine and N-hydroxyethyloleylimidazoline are more preferred, and oleylamine, oleylpropylenediamine and oleyldiethanolamine are even more preferred.

The content of the ashless friction modifier is preferably 0.2 to 1.8% by mass, more preferably 0.2 to 1.7% by mass, and even more preferably 0.2 to 1.5% by mass based on the total amount of the composition.

(G) Other Additives

In the lubricating oil composition of the present invention, various additives may be blended in addition to the above-described components to an extent that does not inhibit the purpose and effect of the present invention. For example, at least one selected from among a viscosity index improver, a pour point depressant, an ashless detergent dispersant, a metal-based detergent, an antioxidant, an anti-rust agent, a metal deactivator, an abrasion preventing agent, a defoaming agent, a friction coefficient modifier and a basic compound can be suitably blended.

Examples of the viscosity index improver include polymers such as a non-dispersant polymethacrylate, a dispersant polymethacrylate, an olefin-based copolymer (e.g., an ethylene-propylene copolymer), a dispersant olefin-based copolymer, and a styrene-based copolymer (e.g., a styrene-diene copolymer and a styrene-isoprene copolymer).

From the viewpoint of achieving a balance between temperature-viscosity characteristics and shear stability, the mass average molecular weight (Mw) of the viscosity index improver is usually 500 to 1,000,000, preferably 5,000 to 800,000, more preferably 10,000 to 600,000, and even more preferably 15,000 to 50,000, but it is suitably set depending on the type of the polymer.

Examples of the pour point depressant include an ethylene-vinylacetate copolymer, a condensate of chlorinated paraffin and naphthalene, a condensate of chlorinated paraffin and phenol, a polymethacrylate and a polyalkyl styrene, and a polymethacrylate is preferably used.

The mass average molecular weight (Mw) of the pour point depressant is usually 50,000 to 150,000.

Examples of the ashless detergent dispersant include imides such as succinimides and boron-containing succinimides, benzylamines, boron-containing benzylamines, and divalent carboxylic acid amides typified by succinic acid. Among them, succinimides are preferred.

Examples of the succinimides include: a monoimide or bisimide of a succinic acid having a polyalkenyl group such as a polybutenyl group having a number average molecular weight of 300 to 4,000 and a polyethylene polyamine such as ethylenediamine, diethylenetriamine, triethylenetetramine, tetraethylenepentamine and pentaethylenehexamine, or boric acid-modified products thereof; and a Mannich reaction product of a phenol having a polyalkenyl group, formaldehyde and a polyethylene polyamine.

Examples of the metal-based detergent include a neutral metal sulfonate, a neutral metal phenate, a neutral metal salicylate, a neutral metal phosphonate, a basic metal sulfonate, a basic metal phenate, a basic metal salicylate, a basic metal phosphonate, an overbased metal sulfonate, an overbased metal phenate, an overbased metal salicylate and an overbased metal phosphonate.

As the antioxidant, any material can be suitably selected from among antioxidants which are used as antioxidants for lubricating oils, and examples thereof include an amine-based antioxidant, a phenol-based antioxidant, a molybdenum-based antioxidant, a sulfur-based antioxidant and a phosphorus-based antioxidant.

These antioxidants may be used solely, or two or more of them may be used in combination.

Examples of the amine-based antioxidant include: diphenylamine-based antioxidants such as diphenylamine and an alkylated diphenylamine having an alkyl group having 3 to 20 carbon atoms; and naphthylamine-based antioxidants such as α-naphthylamine, a phenyl-α-naphthylamine and a substituted phenyl-α-naphthylamine having an alkyl group having 3 to 20 carbon atoms.

Examples of the phenol-based antioxidant include: monophenol-based antioxidants such as 2,6-di-tert-butylphenol, 2,6-di-tert-butyl-4-methylphenol, 2,6-di-tert-butyl-4-ethylphenol, isooctyl-3-(3,5-di-tert-butyl-4-hydroxyphenyl) propionate and octadecyl-3-(3,5-di-tert-butyl-4-hydroxyphenyl) propionate; diphenol-based antioxidants such as 4,4'-methylenebis(2,6-di-tert-butylphenol) and 2,2'-methylenebis(4-ethyl-6-tert-butylphenol); and hindered phenol-based antioxidants.

Examples of the molybdenum-based antioxidant include a molybdenum-amine complex obtained by reacting molybdenum trioxide and/or molybdic acid with an amine compound.

Examples of the sulfur-based antioxidant include dilauryl-3,3'-thiodipropionate.

Examples of the anti-rust agent include fatty acid, alkenylsuccinic acid half ester, fatty acid soap, alkyl sulfonate, polyhydric alcohol fatty acid ester, fatty acid amine, oxidized paraffin and alkyl polyoxyethylene ether.

Examples of the metal deactivator include a benzotriazole-based compound, a tolyltriazole-based compound, a thiadiazole-based compound, an imidazole-based compound and a pyrimidine-based compound.

Examples of the abrasion preventing agent include: sulfur-based compounds such as sulfides, sulfoxides, sulfones and thiophosphinates; halogen-based compounds such as chlorinated hydrocarbons; and organic metal-based compounds such as zinc dithiocarbamate (ZnDTC), oxymolybdenum sulfide organophosphorodithioate (MoDTP), oxymolybdenum sulfide dithiocarbamate (MoDTC) and tricresyl phosphate.

As the defoaming agent, a high-molecular-weight silicone-based defoaming agent is preferred. When the high-molecular-weight silicone-based defoaming agent is contained, defoaming properties are effectively exerted, and ride comfort is improved. Examples of the high-molecular-weight silicone-based defoaming agent include organopolysiloxane, and in particular, a fluorine-containing organopolysiloxane such as trifluoropropylmethyl silicone oil is preferred.

Examples of the friction coefficient modifier include compounds of: higher fatty acids such as oleic acid, stearic acid and palmitic acid; higher alcohols such as lauryl alcohol, oleyl alcohol and cetyl alcohol; esters such as ethyl oleate, sorbitan monostearate and monoglyceride oleate; and amines such as cetylamine, octadecylamine and dimethyloctadecylamine.

Examples of the basic compound include: ammonia; (cyclo)hydrocarbylamines such as methylamine, dimethylamine, ethylamine, diethylamine, (iso)propylamine, di(iso) propylamine, butylamine, dibutylamine, hexylamine, cyclohexylamine, octylamine, 2-ethylhexylamine and isononylamine; polyalkylenepolyamines such as ethylenediamine, propylenediamine, diethylenetriamine, dipropylenetriamine, triethylenetetramine, tetraethylenepentamine and pentaethylenehexamine; cyclic amines such as pyridine and piperazine; and alkanolamines such as monoethanolamine, diethanolamine, triethanolamine, monopropanolamine, dipropanolamine, tripropanolamine, N-cyclohexyldiethanolamine, N,N,N',N'-tetrakis(hydroxyethyl)ethylenediamine and N,N,N',N'-tetrakis(2-hydroxypropyl)ethylenediamine.

The content of each additive can be suitably adjusted to an extent that does not inhibit the effect of the present invention, but it is usually 0.001% by mass to 10% by mass, preferably 0.005% by mass to 8% by mass, and more preferably 0.01% by mass to 5% by mass based on the total amount of the composition.

The total content of the additives is preferably 0% by mass to 35% by mass, more preferably 0% by mass to 25% by mass, even more preferably 0% by mass to 20% by mass, still more preferably 0% by mass to 15% by mass, and particularly preferably 0% by mass to 10% by mass based on the total amount of the composition.

In one embodiment of the lubricating oil composition of the present invention, it is preferred that substantially no fatty acid amide is contained, and the content of the fatty acid amide is preferably less than 0.04% by mass, more preferably less than 0.03% by mass, and even more preferably less than 0.02% by mass based on the total amount of the composition.

When substantially no fatty acid amide is contained, a higher friction coefficient between metals between the element and the pulley can be obtained.

From the viewpoint of ensuring flowability at low temperatures and resistance to seizure due to evaporation at high temperatures, the kinetic viscosity of the lubricating oil composition of the present invention at 40° C. is preferably 5 mm$^2$/s to 35 mm$^2$/s, more preferably 7 mm$^2$/s to 30 mm$^2$/s, and even more preferably 9 mm$^2$/s to 25 mm$^2$/s.

Further, from the viewpoint of ensuring flowability at low temperatures, the kinetic viscosity of the lubricating oil composition for shock absorbers of the present invention at 100° C. is preferably 2 mm$^2$/s to 20 mm$^2$/s, more preferably 2.5 mm²/s to 15 mm²/s, even more preferably 2.8 mm²/s to 10 mm²/s, and particularly preferably 5 mm²/s to 6 mm²/s.

From the viewpoint of ensuring flowability at low temperatures and resistance to seizure due to evaporation at high temperatures, the viscosity index of the lubricating oil composition of the present invention is preferably 100 or more, more preferably 120 or more, and even more preferably 150 or more. The larger the viscosity index is, the better it is, and the upper limit thereof is not particularly limited, but it is generally 250 or less.

From the viewpoint of obtaining a high friction coefficient between metals between the element and the pulley, the amount of phosphorus not bonding to the sulfur atom contained in the lubricating oil composition of the present invention is preferably 10000 mass ppm or less, more preferably 1000 mass ppm or less, and even more preferably 700 mass ppm or less based on the total amount of the lubricating oil composition.

From the viewpoint of obtaining a high friction coefficient between metals between the element and the pulley, the amount of calcium contained in the lubricating oil composition of the present invention is preferably 10000 mass ppm or less, more preferably 1000 mass ppm or less, and even more preferably 700 mass ppm or less based on the total amount of the lubricating oil composition.

From the viewpoint of obtaining a high friction coefficient between metals between the element and the pulley, the amount of sulfur contained in the lubricating oil composition of the present invention is preferably 10000 mass ppm or less, more preferably 800 mass ppm or less, and even more preferably 500 mass ppm or less based on the total amount of the lubricating oil composition.

From the viewpoint of obtaining a high friction coefficient between metals between the element and the pulley, the amount of nitrogen contained in the lubricating oil composition of the present invention is preferably 10000 mass ppm or less, more preferably 800 mass ppm or less, and even more preferably 500 mass ppm or less based on the total amount of the lubricating oil composition.

The lubricating oil composition of the present invention can be produced by blending the respective components in the base oil and homogeneously dispersing them, wherein stirring or the like is performed according to need. In one embodiment of the present invention, after the base oil is heated to 50° C., the respective components are blended therein, and the mixture is stirred, thereby dispersing the respective components in the base oil more homogeneously.

The lubricating oil composition of the present invention is preferred as a lubricating oil for transmissions, and particularly preferred as a lubricating oil for continuously variable transmissions. In particular, the lubricating oil composition of the present invention is preferred as a lubricating oil for belt-type (e.g., pushbelt-type, chain-type or the like) continuously variable transmissions, and particularly preferred as a lubricating oil composition for metal belt-type continuously variable transmissions.

According to a preferred embodiment of the present invention, by using the lubricating oil composition of the present invention as a lubricating oil composition for metal belt-type continuously variable transmissions, the friction coefficient between metals between the element and the pulley can be controlled to be high, and the friction coefficient between metals between the gear and the bearing that are constituents of continuously variable transmissions can be controlled to be low. For this reason, power transmission between the element and the pulley can be effectively performed, friction between the gear and the bearing can be suppressed to improve efficiency, and it can contribute to the improvement of fuel efficiency.

2. Continuously Variable Transmission

The continuously variable transmission of the present invention is not particularly limited as long as it is filled with the lubricating oil composition described in "1. Lubricating oil composition" above, but a belt-type (e.g., pushbelt-type, chain-type or the like) continuously variable transmission is preferred, and a metal belt-type continuously variable transmission is particularly preferred since lubricity of the lubricating oil composition can be more effectively exerted therein.

FIG. 1 is a schematic view of a metal belt-type continuously variable transmission according to one embodiment of the present invention. As shown in FIG. 1, a metal belt 1 is hung over two pulleys, which are a pulley (input side) 2 connected to an input axis connected to an engine clutch and a pulley (output side) 3 connected to an output axis at the side of a final gear 7, to constitute a speed change mechanism of a metal belt-type continuously variable transmission 10. The portion of the speed change mechanism is filled with the lubricating oil composition (not shown).

Each of the pulleys 2 and 3 that rotate is constituted by combining two conical disks, and power is transmitted by friction force between a conical slope and a side of the belt 1 opposed to each other. Speed change can be carried out in a stepless manner by relatively changing the groove widths of the input side pulley 2 and the output side pulley 3 to change the effective radius of the metal belt 1. In each of gears including a side gear 4, a reverse gear 5, an output gear 6 and a final gear 7, a bearing is incorporated into a bearing portion thereof (not shown).

Figure 2:
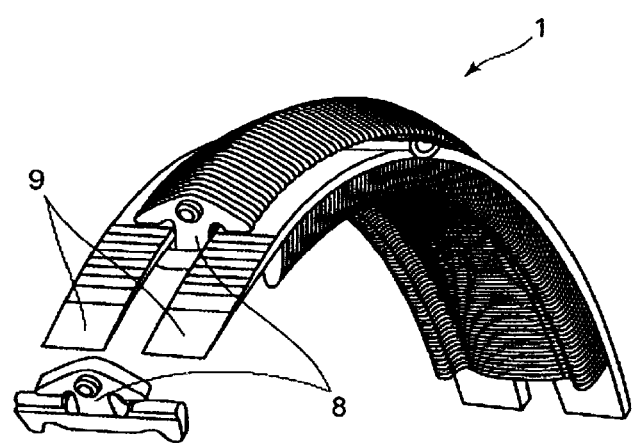
FIG. 2 is a schematic perspective view of a metal belt to be used for a metal belt-type continuously variable transmission according to one embodiment of the present invention.

FIG. 2 is a schematic perspective view of a metal belt to be used for a metal belt-type continuously variable transmission according to one embodiment of the present invention. As shown in FIG. 2, a metal belt 1 is composed of several hundreds of thin steel elements 8 having a V angle and two pairs of thin steel laminated rings 9 between which the elements 8 are held. The metal belt 1 moves when each element 8 pushes another element 8 positioned in front of it.

According to a preferred embodiment of the present invention, for example, in the case of the metal belt-type continuously variable transmission, since it is filled with the aforementioned lubricating oil composition, the friction coefficient between metals between the element and the pulley is high and power transmission can be performed, while the friction coefficient between metals between the gear and the bearing that are constituents of the continuously variable transmission is low and efficient operation can be performed, and therefore the continuously variable transmission of the present invention is excellent in fuel efficiency.

The continuously variable transmission of the present invention can be utilized for either four-wheeled vehicles or two-wheeled vehicles, but it is particularly preferred as a continuously variable transmission for four-wheeled vehicles.

3. Friction Control Method for Continuously Variable Transmissions

The friction control method for continuously variable transmissions of the present invention includes using the lubricating oil composition described in "1. Lubricating oil composition" above as a lubricating oil composition for continuously variable transmissions.

According to a preferred embodiment of the present invention, by using the lubricating oil composition described in "1. Lubricating oil composition" above as a lubricating oil composition for continuously variable transmissions, different frictions between metals between different parts of the continuously variable transmission can be appropriately controlled as described above, and it can contribute to the improvement of fuel efficiency.

The friction control method of the present invention can control friction between metals in continuously variable transmissions for either four-wheeled vehicles or two-wheeled vehicles, but it is particularly excellent in the effect of controlling friction between metals in continuously variable transmissions for four-wheeled vehicles.

EXAMPLES

Hereinafter, the present invention will be more specifically described by way of examples. However, the present invention is not limited thereto.

<Measurement Methods for Physical Properties>
(1) Kinetic viscosities at 40° C. and at 100° C.
The measurement was carried out in accordance with JIS K2283:2000.
(2) Viscosity index
The measurement was carried out in accordance with JIS K2283:2000.
(3) Content of phosphorus (P)
The measurement was carried out in accordance with JIS K2609.
(4) Content of calcium (Ca)
The measurement was carried out in accordance with JIS K2609.
(5) Content of nitrogen (N)
The measurement was carried out in accordance with JIS K2609.
(6) Friction coefficient between metals μ (corresponding to gear/bearing):
The friction coefficient between metals μ was measured using a block-on-ring tester (LFW-1) described in ASTM D2174. Specific test conditions are as described below.

Test Jigs:
    Ring: Falex S-10 Test Ring (SAE4620 Steel)
    Block: Falex H-60 Test Block (SAE01 Steel)
Test Conditions:
    Oil temperature: 80° C.
    Load: 735N
    Sliding velocity: sequentially kept at 1.0, 0.5, 0.25, 0.125 and 0.063 m/s each for 5 minutes
    Friction coefficient: a measurement value obtained during 30 seconds before change in the sliding velocity
(Conditions for running-in: oil temperature: 80° C., load: 735N, sliding velocity: 4 m/s, time: 30 minutes)
(7) Friction coefficient between metals μ (corresponding to element/pulley):
The friction coefficient between metals μ was measured using a block-on-ring tester (LFW-1) described in ASTM D2174. Specific test conditions are as described below.

Test jigs:
    Ring: Falex S-10 Test Ring (SAE4620 Steel)
    Block: Falex H-60 Test Block (SAE01 Steel)
Test Conditions:
    Oil temperature: 110° C.
    Load: 1112N
    Sliding velocity: sequentially kept at 1.0, 0.5, 0.25, 0.125 and 0.063 m/s each for 5 minutes
    Friction coefficient: a measurement value obtained during 30 seconds before change in the sliding velocity
(Conditions for running-in: oil temperature: 110° C., load: 1112N, sliding velocity: 0.125 m/s, time: 30 minutes)

Example 1 and Comparative Examples 1 and 2

The lubricating oil compositions of Example 1 and Comparative Examples 1 and 2 having the compositions shown in Table 1 were prepared, and physical properties thereof were measured.

TABLE 1

| | | | Example 1 | Comparative Example 1 | Comparative Example 2 |
|---|---|---|---|---|---|
| Base oil | Mineral oil 1 | % by mass | | 73.39 | |
| | Mineral oil 2 | % by mass | 80.33 | | 81.53 |
| Polymer | PMA1 | % by mass | | 16.90 | |
| | PMA2 | % by mass | 10.10 | | 10.10 |
| Additives | Diamine | % by mass | 0.07 | | 0.07 |
| | Glycolic acid amide | % by mass | 0.80 | | 0.80 |
| | Phosphorous acid ester | % by mass | 1.20 | 1.20 | |
| | Oleylamine | % by mass | 0.02 | 0.05 | 0.02 |
| | Fatty acid amide | % by mass | | 0.05 | |
| | Ashless imide | % by mass | 1.20 | 1.00 | 1.20 |
| | Tertiary amine | % by mass | 0.25 | 0.80 | 0.25 |
| | Diethanolamine | % by mass | 0.02 | | 0.02 |
| | Glyceride | % by mass | 0.15 | 0.30 | 0.15 |
| | Remaining portion | % by mass | 5.86 | 6.31 | 5.86 |
| TOTAL | | % by mass | 100.00 | 100.00 | 100.00 |
| Kinetic viscosity | 40° C. | mm2/s | 22.91 | 25.60 | 22.20 |
| | 100° C. | mm2/s | 5.44 | 7.00 | 5.32 |
| Viscosity index | | | 187 | 259 | 188 |
| Element content | P | ppm | 605 | 606 | 462 |
| | Ca | ppm | 508 | 501 | 503 |
| | N | ppm | 1500 | 1500 | 1500 |
| μ between metals (gear/bearing) | 80° C., 4 m/s, 735N | | — | 0.061 | 0.085 | 0.037 |
| μ between metals (element/pulley) | 110° C., 0.125 m/s, 1112N | | — | 0.121 | 0.121 | 0.112 |

The used components in Table 1 are as described below.

Mineral oil 1: Gr III mineral oil (kinetic viscosity at 100° C.: 4.4 mm²/s, viscosity index: 127)

Mineral oil 2: Gr III mineral oil (kinetic viscosity at 100° C.: 3.6 mm²/s, viscosity index: 126)

PMA1: polymethacrylate (mass average molecular weight: 30000)

PMA2: polymethacrylate (mass average molecular weight: 35000)

Diamine: N-oleyl-1,3-propanediamine

Glycolic acid amide: glycolic acid amide (C), it is a reaction product of glycolic acid and a secondary amine derived from coconut palm (dicocoalkylamine), which has $R^4$ and $R^5$ in general formula (II), and which has at least a dodecyl group, a tetradecyl group, a decyl group, a hexadecyl group, an octadecyl group and an octadecenyl group as said $R^4$ and $R^5$, wherein the contents of the groups relative to the whole $R^4$ and $R^5$ are respectively 61% by mass, 19% by mass, 5.5% by mass, 7% by mass, 2% by mass and 3.5% by mass.

Phosphorous acid ester: 2-ethylhexyl hydrogen phosphite

Fatty acid amide: isostearic acid amide

Ashless imide: polybutenyl succinimide

Tertiary amine: dimethyloctadecylamine

Glyceride: monoglyceride oleate

Remaining portion: sulfur-based abrasion preventing agent, antioxidant, copper deactivator, defoaming agent, detergent, dispersant and phosphorus-based abrasion preventing agent As shown in Table 1, in the case of the example composition including the diamine, glycolic acid amide and phosphorous acid ester in addition to the base oil, the friction coefficient between metals under the environment corresponding to gear/bearing was low, while the friction coefficient between metals under the environment corresponding to element/pulley was high (Example 1).

Meanwhile, in the case of excluding at least one of the diamine, glycolic acid amide and phosphorous acid ester, at least one or both of the friction coefficients between metals under the above-described environments did not satisfy the desired ranges (Comparative Examples 1 and 2).

INDUSTRIAL APPLICABILITY

The lubricating oil composition of the present invention is preferred as a lubricating oil for transmissions, and particularly preferred as a lubricating oil for continuously variable transmissions. In particular, the lubricating oil composition of the present invention is preferred as a lubricating oil for belt-type (e.g., pushbelt-type, chain-type or the like) continuously variable transmissions, and particularly preferred as a lubricating oil composition for metal belt-type continuously variable transmissions.

REFERENCE SIGNS LIST

1: metal belt
2: pulley (input side)
3: pulley (output side)
4: side gear (forward)
5: reverse gear
6: output gear
7: final gear
8: element
9: laminated ring
10: continuously variable transmission

The invention claimed is:

1. A lubricating oil composition, comprising a base oil (A), a diamine (B), a glycolic acid amide (C) and a phosphorous acid ester (D),
   wherein the content of the diamine (B) is 0.03% by mass to 0.1% by mass based on the total amount of the composition,
   the content of the glycolic acid amide (C) is 0.1% by mass to 3% by mass based on the total amount of the composition,
   the content of the phosphorous acid ester (D) is 0.8% by mass to 2% by mass based on the total amount of the composition,
   friction coefficients between metals μ corresponding to a gear and a bearing and to an element and a pulley are 0.061 or less and 0.121 or more, respectively, as measured using a block-on-ring tester (LFW-1) as described in ASTM D2174, and
   the diamine is a compound represented by the following formula (I)

wherein $R^1$ represents a hydrocarbon group having 16 to 22 carbon atoms;
$R^2$ represents hydrogen or an alkyl group; and
$R^3$ represents an alkylene group having 1 to 5 carbon atoms.

2. The lubricating oil composition according to claim 1, wherein the content of the phosphorous acid ester (D) is 0.8% by mass to 1.8% by mass based on the total amount of the composition.

3. The lubricating oil composition according to claim 1, wherein the kinetic viscosity at 100° C. is 2 mm²/s to 20 mm²/s.

4. The lubricating oil composition according to claim 1, wherein the content of a fatty acid amide is less than 0.04% by mass based on the total amount of the composition.

5. The lubricating oil composition according to claim 1, which is for transmissions.

6. A continuously variable transmission filled with the lubricating oil composition of claim 1.

7. A friction control method for continuously variable transmissions, the method comprising lubricating a continuously variable transmission with the lubricating oil composition of claim 1.

8. The lubricating oil composition according to claim 1, wherein the phosphorous acid ester (D) comprises a compound represented by the following formula (III):

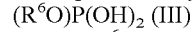

wherein $R^6$ represents a hydrocarbon group having 2 to 24 carbon atoms.

9. The lubricating oil composition according to claim 8, wherein $R^6$ represents a branched alkyl group having 2 to 24 carbon atoms or a branched alkenyl group having 2 to 24 carbon atoms.

10. The lubricating oil composition according to claim 8, wherein the phosphorous acid ester (D) consists of the compound represented by formula (III), and
    the content of the phosphorous acid ester (D) is 1.2% by mass to 2% by mass based on the total amount of the composition.

* * * * *